(12) United States Patent
Garrod et al.

(10) Patent No.: US 12,528,255 B1
(45) Date of Patent: Jan. 20, 2026

(54) METHOD FOR THREE DIMENSIONAL PRINTING USING LEAD-IN AND LEAD-OUT BLOCKS

(71) Applicant: CHROMATIC 3D MATERIALS, INC., Golden Valley, MN (US)

(72) Inventors: Michael Garrod, Minnetrista, MN (US); Shihchuan Kao, New Brighton, MN (US); Garth Benson, Burnsville, MN (US)

(73) Assignee: Chromatic 3D Materials Inc, Golden Valley, MN (US)

( * ) Notice: Subject to any disclaimer, the term of this patent is extended or adjusted under 35 U.S.C. 154(b) by 36 days.

(21) Appl. No.: 18/040,281

(22) PCT Filed: Aug. 3, 2021

(86) PCT No.: PCT/US2021/044252
§ 371 (c)(1),
(2) Date: Feb. 2, 2023

(87) PCT Pub. No.: WO2022/031639
PCT Pub. Date: Feb. 10, 2022

Related U.S. Application Data

(60) Provisional application No. 63/060,342, filed on Aug. 3, 2020.

(51) Int. Cl.
*B29C 64/40* (2017.01)
*B29C 64/118* (2017.01)
(Continued)

(52) U.S. Cl.
CPC ............ *B29C 64/40* (2017.08); *B29C 64/118* (2017.08); *B29C 64/141* (2017.08);
(Continued)

(58) Field of Classification Search
CPC .............................. B29C 64/118; B29C 64/40
See application file for complete search history.

(56) References Cited

U.S. PATENT DOCUMENTS 6,054,077 A    4/2000  Comb et al.
9,688,024 B2 * 6/2017  Stava ...................... B22F 10/50
(Continued)

FOREIGN PATENT DOCUMENTS

CA         2295548 A1      1/1999
DE    102018127311 A1 *   4/2020   ............. B33Y 40/00
(Continued)

*Primary Examiner* — Atul P. Khare
(74) *Attorney, Agent, or Firm* — LELKES IP; Robert S. Lelkes

(57) ABSTRACT

A three-dimensional (3D) object and a 3D object production process comprising: providing a thermoset printing apparatus comprising: a mixing chamber to receive and mix at least a first reactive component and a second reactive component to provide thermosetting material, an extrusion nozzle to deliver the thermosetting material to form a 3D object, at least one actuator coupled to the extrusion nozzle to move the extrusion nozzle when delivering the thermosetting material to form the 3D object, and a controller comprising one or more processors and coupled to the extruded thermoset printing apparatus, and depositing the thermosetting material to form the 3D object, wherein the depositing comprises depositing a lead-in block layer of thermosetting material, depositing a lead-in bridge layer of thermosetting material, depositing a main part layer of thermosetting material, depositing a lead-out bridge layer, and depositing a lead-out block layer.

19 Claims, 2 Drawing Sheets

(51) Int. Cl.
   *B29C 64/141* (2017.01)
   *B29C 64/371* (2017.01)
   *B29K 101/10* (2006.01)
   *B33Y 10/00* (2015.01)
   *B33Y 70/00* (2020.01)
   *B33Y 80/00* (2015.01)

(52) U.S. Cl.
   CPC ........ *B29C 64/371* (2017.08); *B29K 2101/10* (2013.01); *B33Y 10/00* (2014.12); *B33Y 70/00* (2014.12)

(56) References Cited

U.S. PATENT DOCUMENTS

| | | | |
|---|---|---|---|
| 9,707,717 B2 | 7/2017 | Sand | |
| 9,833,985 B2 * | 12/2017 | Kobayashi | B29C 70/545 |
| 9,844,917 B2 * | 12/2017 | Burhop | B29C 64/40 |
| 10,220,569 B2 * | 3/2019 | Schmidt | G05B 19/4099 |
| 10,414,096 B2 * | 9/2019 | Yoshida | B29C 64/40 |
| 10,639,842 B2 | 5/2020 | Leibig et al. | |
| 11,065,816 B2 | 7/2021 | Leibig et al. | |
| 11,407,180 B2 * | 8/2022 | Moosberg | C04B 35/63456 |
| 11,511,485 B2 * | 11/2022 | Mojdeh | A61C 7/08 |
| 2002/0017743 A1 | 2/2002 | Priedeman et al. | |
| 2014/0361460 A1 | 12/2014 | Mark | |
| 2015/0040428 A1 | 2/2015 | Davis et al. | |
| 2015/0352787 A1 | 12/2015 | Humbert et al. | |
| 2016/0009029 A1 | 1/2016 | Cohen et al. | |
| 2016/0263822 A1 | 9/2016 | Boyd, IV et al. | |
| 2016/0346997 A1 | 12/2016 | Lewis et al. | |
| 2017/0043533 A1 | 2/2017 | Chang | |
| 2017/0043536 A1 | 2/2017 | Schmehl et al. | |
| 2017/0292922 A1 | 10/2017 | Woods et al. | |
| 2018/0079141 A1 * | 3/2018 | Yoshida | B29C 64/40 |
| 2018/0297115 A1 | 10/2018 | Diwinsky et al. | |
| 2019/0168446 A1 * | 6/2019 | Leibig | B29C 64/209 |
| 2019/0217518 A1 | 7/2019 | Mark et al. | |
| 2019/0337235 A1 * | 11/2019 | Moosberg | B33Y 30/00 |
| 2020/0046062 A1 * | 2/2020 | Perillo | A43B 3/12 |
| 2020/0215635 A1 | 7/2020 | Peters et al. | |
| 2020/0324717 A1 | 10/2020 | Raychaudhuri | |
| 2023/0114202 A1 * | 4/2023 | Häfele | A61C 13/08 |
| | | | 433/191 |
| 2023/0219283 A1 | 7/2023 | Leibig et al. | |

FOREIGN PATENT DOCUMENTS

| | | | |
|---|---|---|---|
| EP | 2955004 A1 | 12/2015 | |
| EP | 3307839 B1 | 4/2018 | |
| WO | WO-0020215 A1 * | 4/2000 | ........ B29C 47/0014 |
| WO | 2006044305 A1 | 4/2006 | |
| WO | 2016191329 A1 | 12/2016 | |
| WO | 2019113364 A1 | 6/2019 | |
| WO | 2019204074 A2 | 10/2019 | |

* cited by examiner

METHOD FOR THREE DIMENSIONAL PRINTING USING LEAD-IN AND LEAD-OUT BLOCKS

STATEMENT REGARDING FEDERALLY SPONSORED RESEARCH OR DEVELOPMENT

This invention was made with Government support under NSF Phase II Grant 1853265 awarded by the National Science Foundation. The Government has certain rights to this invention.

FIELD

The present disclosure relates to 3D additive manufacturing methods and methods of 3D additive manufacturing using a lead-in block layer and a lead-in bridge layer and/or a lead-out bridge layer and a lead-out block layer. The application also relates to a 3D object prepared by 3D additive manufacturing.

BACKGROUND

Fused filament fabrication (FFF), also referred to as thermoplastic extrusion, plastic jet printing (PJP), fused filament method (FFM), or fusion deposition modeling, is an additive manufacturing process wherein a material is extruded in successive layers onto a platform to form a three-dimensional (3D) product. Typically. FFF uses a melted thermoplastic material that is extruded onto a platform. Three-dimensional printing (3D printing) sometimes uses support structures that are easily dissolved or removed from the part after printing.

Disadvantages of existing FFF technology using thermoplastics include single material property printing, limited print-direction strength, limited durability, and limited softness. Thermosetting materials have generally not been used in FFF because prior to cure, the monomers are low viscosity liquids, and upon deposition, the curing liquid flows or breaks into droplets, resulting in finished parts of low quality and undesirably low resolution. Attempts to print with thermosetting materials has required addition of fillers (such as inorganic powders or polymers) to induce thixotropic behavior in the resin before it is fully cured. These solutions adversely affect the final properties of the printed part. Other problems include poor resolution control in the printed part and frequent clogging of mixing systems.

Starting or ending a printing layer during 3D printing can create problems associated with 3D object quality.

SUMMARY

The present disclosure is related to 3D printing processes and 3D printed objects.

In certain embodiments, the present disclosure is directed to a three-dimensional (3D) object production process comprising: providing a thermoset printing apparatus comprising: a mixing chamber to receive and mix at least a first reactive component and a second reactive component to provide a thermosetting material, an extrusion nozzle to deliver the thermosetting material to form a 3D object, at least one actuator coupled to the extrusion nozzle to move the extrusion nozzle when delivering the thermosetting material to form the 3D object, and a controller comprising one or more processors and coupled to the extruded thermoset printing apparatus, and depositing the thermosetting material to form the 3D object, wherein the depositing comprises depositing a lead-in block layer of thermosetting material, depositing a lead-in bridge layer of thermosetting material, and depositing a main part layer of thermosetting material. In certain embodiments, the process comprises depositing a lead-out bridge layer of thermosetting material and depositing a lead-out block layer of thermosetting material.

In certain embodiments, the present disclosure is directed to a three-dimensional (3D) object production process comprising: providing a thermoset printing apparatus comprising: a mixing chamber to receive and mix at least a first reactive component and a second reactive component to provide a thermosetting material, an extrusion nozzle to deliver the thermosetting material to form a 3D object, at least one actuator coupled to the extrusion nozzle to move the extrusion nozzle when delivering the thermosetting material to form the 3D object, and a controller comprising one or more processors and coupled to the extruded thermoset printing apparatus, and depositing the thermosetting material to form the 3D object, wherein the depositing comprises depositing a main part layer of thermosetting material, depositing a lead-out bridge layer of thermosetting material, and depositing a lead-out block layer of thermosetting material. In certain embodiments, the process comprises depositing a lead-in block layer and depositing a lead-in bridge layer of thermosetting material.

In certain embodiments, the present disclosure is directed to a process for three-dimensional (3D) printing, comprising: depositing a lead-in block layer of thermosetting material, depositing a lead-in bridge layer of thermosetting material, and depositing a main part layer of thermosetting material. In certain embodiments, the process comprises depositing a lead-out bridge layer of thermosetting material and depositing a lead-out block layer of thermosetting material.

In certain embodiments, the present disclosure is directed to a process for three-dimensional (3D) printing, comprising: depositing a main part layer of thermosetting material, depositing a lead-out bridge layer of thermosetting material, and depositing a lead-out block layer of thermosetting material. In certain embodiments, the process comprises depositing a lead-in block layer and depositing a lead-in bridge layer of thermosetting material.

In certain embodiments, the process comprises depositing an exterior of the lead-in block layer. In certain embodiments, the process comprises depositing an exterior of the lead-out block layer.

In certain embodiments of the process, a last bead of the lead-in bridge layer is adjacent to a first bead of the main part layer. In certain embodiments of the process, a last bead of the main part layer is adjacent to a first bead of the lead-out bridge layer. In certain embodiments, the process comprises a gap between the lead-in bridge layer and the main part layer and/or a gap between the main part layer and the lead-out bridge layer.

In certain embodiments of the process, the Linear extrusion density of the depositing of the lead-in block layer, the lead-in bridge layer, the main part layer, the lead-out bridge layer, and/or the lead-out block layer is constant. In certain embodiments of the process, the Linear extrusion density of the depositing of the lead-in block layer, the lead-in bridge layer, the main part layer, the lead-out bridge layer, and/or the lead-out block layer is non-constant.

In certain embodiments of the process, the depositing compromises a bead spacing of the thermosetting material from about 0.1 mm to about 2 mm. In certain embodiments of the process, the depositing compromises a bead spacing of the thermosetting material from about 0.2 mm to about 1 mm. In certain embodiments of the process, the depositing compromises a bead spacing of the thermosetting material from about 0.3 mm to about 0.8 mm. In certain embodiments of the process, the depositing compromises a bead spacing of the thermosetting material less than about 1 mm. In certain embodiments of the process, the depositing compromises a bead spacing of the thermosetting material less than about 0.8 mm. In certain embodiments of the process, the depositing compromises a bead spacing of the thermosetting material less than about 0.7 mm.

In certain embodiments, the process comprises removing the lead-in block layer, lead-in bridge layer, lead-out bridge layer, and/or lead-out bridge layer. In certain embodiments, the removing comprises cutting and/or sanding.

In certain embodiments of the process, at least one printing parameter is the same between each of the depositing of the lead-in block layer, the lead-in bridge layer, the main part layer, the lead-out bridge layer, and/or the lead-out block layer. In certain embodiments of the process, at least one printing parameter is different between each of the depositing of the lead-in block layer, the lead-in bridge layer, the main part layer, the lead-out bridge layer, and/or the lead-out block layer. In certain embodiments of the process, at least one printing parameter is the same between the layer and an at least second layer. In certain embodiments of the process, at least one printing parameter is different between the layer and an at least second layer.

In certain embodiments of the process, the depositing compromises a translation speed of at least about 100 mm/min. In certain embodiments of the process, the depositing compromises a translation speed of at least about 500 mm/min. In certain embodiments of the process, the depositing compromises a translation speed of at least about 1000 mm/min. In certain embodiments of the process, the depositing compromises a translation speed of at least about 5000 mm/min. In certain embodiments of the process, the depositing compromises a translation speed of from about 100 mm/min to about 5000 mm/min. In certain embodiments of the process, the depositing compromises a translation speed of from about 500 mm/min to about 1000 mm/min.

In certain embodiments of the process, the depositing compromises a flow rate of from about 0.1 $mm^3/s$ to about 200 $mm^3/s$. In certain embodiments of the process, the depositing compromises a flow rate of from about 1 $mm^3/s$ to about 100 $mm^3/s$. In certain embodiments of the process, the depositing compromises a flow rate of from about 5 $mm^3/s$ to about 50 $mm^3/s$.

In certain embodiments, the process comprises at least a third reactive component. In certain embodiments, the process comprises at least a fourth reactive component.

In certain embodiments of the process, the thermosetting material comprises a viscoelasticity having a G'/G" greater than about 0.1.

In certain embodiments of the process, the thermoset printing apparatus comprises a suction pump. In certain embodiments, the process comprises applying suction during the depositing. In certain embodiments, the process comprises applying suction for at least about 1 second. In certain embodiments, the process comprises applying suction for at least about 10 seconds. In certain embodiments, the process comprises comprising applying suction for from about 1 second to about 5 minutes. In certain embodiments, the process comprises applying suction for from about 5 seconds to about 1 minute.

In certain embodiments, the present disclosure is directed to a 3D object produced by the disclosed process.

In certain embodiments, the present disclosure is directed to a 3D object comprising: a lead-in block, a lead-in bridge, and a main part. In certain embodiments, the 3D object comprises a lead-out bridge and a lead-out block.

In certain embodiments, the present disclosure is directed to a 3D object comprising a main part, a lead-out bridge, and a lead-out block. In certain embodiments, the 3D comprises a lead-in block and a lead-in bridge.

It is to be understood that both the Summary and the Detailed Description are exemplary and explanatory only, and are not restrictive of the disclosure as claimed.

DETAILED DESCRIPTION

Figure 1:
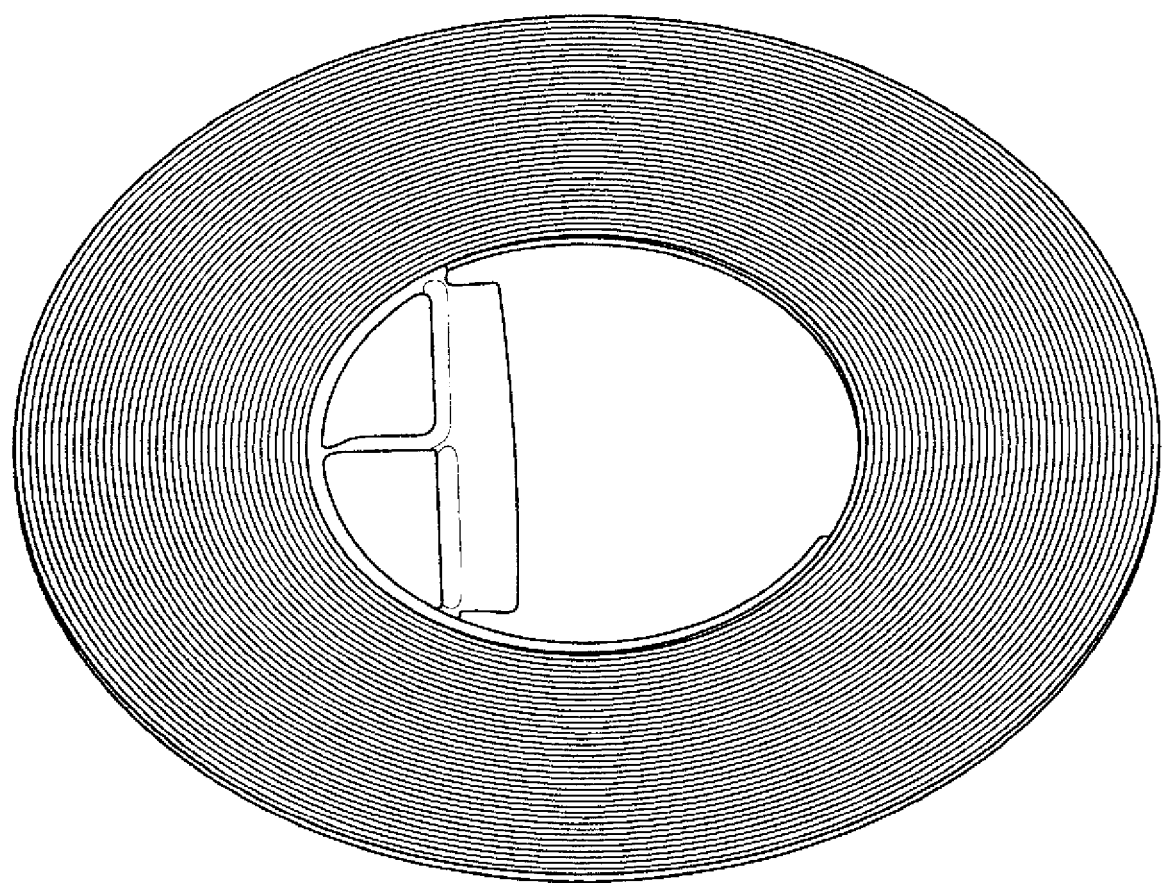
FIG. 1 depicts a 3D object of donut shape having a lead-out bridge and lead-out block.

Embodiments of the disclosure relate to methods for 3D additive manufacturing and methods for 3D printing. Embodiments of the disclosure also relate to a 3D object prepared by 3D printing.

With 3D urethane printing, there can be a pressure buildup in a tip when beginning 3D printing of a layer and in between extruding/depositing layers of thermosetting material. As a result, the beginning of the layer can have undesirable voids, blobs, or uneven thicknesses.

Applicant has surprisingly discovered that a lead-in block can be printed in parallel to the main part when it is connected to the main part through a bridge of material. The n*s layer of the lead-in block can printed immediately before the $n^d$ layer of the main part. There can be continuous extrusion between printing the lead-in block and the main part. This process allows the flow rate and pressure in the tip to stabilize before printing the main part. The lead-in block can be manually removed from the main part after printing. By following embodiments of the disclosure, it is possible to 3D print an object having a smooth finish, high resolution, and a precise edge.

Further, at the end of a layer, there can often be undesired drooling at the tip. The material oozing out of the tip can prevent the part from having a smooth finish or precise edge. To prevent oozing material from damaging the part, a lead-out block can be printed in parallel to the main part and connected by a thin bridge of material. The $n^{th}$ layer of the lead-out block can be printed immediately after the $n^{th}$ layer of the main part. There can be continuous extrusion between printing the main part and the lead-out block. This process can allow the main part to be very smooth and printed at a consistent flow rate. The variations and any printing inconsistencies associated with ending a layer can occur in the lead-out block, which can be later cut off.

Embodiments of the disclosure unexpectedly overcome these problems. By following embodiments of the disclosure, it is possible to 3D print an object having a smooth finish, high resolution, and a precise edge.

Embodiments of the disclosure relate to a three-dimensional (3D) object production process comprising: providing a thermoset printing apparatus comprising: a mixing chamber to receive and mix at least a first reactive component and a second reactive component to provide a thermosetting material, an extrusion nozzle to deliver the thermosetting material to form a 3D object, at least one actuator coupled to the extrusion nozzle to move the extrusion nozzle when delivering the thermosetting material to form the 3D object, and a controller comprising one or more processors and coupled to the extruded thermoset printing apparatus, and depositing the thermosetting material to form the 3D object, wherein the depositing comprises depositing a lead-in block layer of thermosetting material, depositing a lead-in bridge layer of thermosetting material, and depositing a main part layer of thermosetting material.

Embodiments of the disclosure also relate to a three-dimensional (3D) object production process comprising: providing a thermoset printing apparatus comprising: a mixing chamber to receive and mix at least a first reactive component and a second reactive component to provide a thermosetting material, an extrusion nozzle to deliver the thermosetting material to form a 3D object, at least one actuator coupled to the extrusion nozzle to move the extrusion nozzle when delivering the thermosetting material to form the 3D object, and a controller comprising one or more processors and coupled to the extruded thermoset printing apparatus, and depositing the thermosetting material to form the 3D object, wherein the depositing comprises depositing a main part layer of thermosetting material, depositing a lead-out bridge layer of thermosetting material, and depositing a lead-out block layer of thermosetting material.

Embodiments of the disclosure relate to a process for three-dimensional (3D) printing, comprising: depositing a lead-in block layer of thermosetting material, depositing a lead-in bridge layer of thermosetting material, and depositing a main part layer of thermosetting material.

Embodiments of the disclosure also relate to a process for three-dimensional (3D) printing, comprising: depositing a main part layer of thermosetting material, depositing a lead-out bridge layer of thermosetting material, and depositing a lead-out block layer of thermosetting material.

Embodiments of the disclosure relate to a 3D object comprising: a lead-in block, a lead-in bridge, and a main part.

Embodiments of the disclosure relate to a 3D object comprising: a main part, a lead-out bridge, and a lead-out block.

Embodiments of the disclosed processes can be used in the disclosed systems. Embodiments of the disclosed systems can be used in the disclosed processes.

The present disclosure also relates to a 3D object produced according to the disclosed processes. The present disclosure also relates to a 3D object produced using the disclosed system.

Various examples and embodiments of the subject matter disclosed are possible and will be apparent to a person of ordinary skill in the art, given the benefit of this disclosure. In this disclosure reference to "some embodiments," "certain embodiments," "certain exemplary embodiments" and similar phrases each means that those embodiments are non-limiting examples of the inventive subject matter, and there may be alternative embodiments which are not excluded.

The articles "a," "an," and "the" are used herein to refer to one or more than one (i.e., to at least one) of the grammatical object of the article. By way of example, "an element" means one element or more than one element.

As used herein, the term "about" means±10% of the noted value. By way of example only, at least "about 50 seconds" could include from at least 45 seconds to and including at least 55 seconds.

The word "comprising" is used in a manner consistent with its open-ended meaning, that is, to mean that a given product or process can optionally also have additional features or elements beyond those expressly described. It is understood that wherever embodiments are described with the language "comprising," otherwise analogous embodiments described in terms of "consisting of" and/or "consisting essentially of" are also contemplated and within the scope of this disclosure.

As used herein, the term "additive manufacturing" means extruded printing of thermosetting material. Additive manufacturing can be used interchangeably with 3D printing.

As used herein the term "layer translation path" means the path that is traversed by the printhead or extrusion nozzle while depositing material in the layer. In certain embodiments, the path can be followed to deposit material in the areas that have been specified by the slicing application. In certain embodiments, the layer translational path can be chosen such that a minimum amount of time elapses before an adjacent bead is placed. In certain embodiments, this minimum amount of time can be from about 1 second to about 5 minutes. In certain embodiments, this minimum amount of time can be from about 5 seconds to about 1 minute. In certain embodiments, this minimum amount of time can be about 1 second, about 5 seconds, about 10 seconds, about 15 seconds, about 20 seconds, about 25 seconds, about 30 seconds, about 35 seconds, about 40 seconds, about 45 seconds, about 50 seconds, about 60 seconds, about 90 seconds, about 2 minutes, about 3 minutes, about 4 minutes, about 5 minutes, or any ranges between the specified values. If an insufficient amount of time has elapsed, the beads can combine and form a bead with a different aspect ratio than a single bead. In certain embodiments, the algorithm which constructs a translation path can control a layer translation path such that a bead deformation does not occur when beads are placed adjacent to one another.

As used herein, the terms "thermoset," "thermoset product," and "thermoset material" are used interchangeably and refer to the reaction product of at least two chemicals which form a covalently bonded crosslinked or polymeric network. In contrast to thermoplastics, a thermoset product described herein can irreversibly solidify or set.

As used herein, the term "thermosetting material" refers to a covalently bonded crosslinked or polymeric network that is still reactive, e.g., it can still have hydroxyl, amine, and/or isocyanate functionality that gives a measureable hydroxyl number, NH number, or NCO number in a titration. In one embodiment, a thermosetting material can have a viscosity below 3,000,000 cp. In one embodiment, thermosetting material can have a molecular weight of no greater than 100,000 g/mol.

As used herein, the term "lead-in block" refers to a portion of thermosetting material that can connect to the lead-in bridge. The lead-in block can be located in an interior cavity or in an exterior cavity of the main part. Lead-in blocks can assist in priming the printer tip and establishing steady flow. The nth layer of a lead-in block is printed before the nth layer of the lead-in bridge and the nth layer of the main part. The dimensions of the block are not limiting and can be varied as set by the user. The block can be any geometric shape, thickness, width, or length. It can be rectangular, circular, triangular, or any other shape.

As used herein, the term "lead-in bridge" refers to a portion of thermosetting material that can connect the lead-in block to the main part. The dimensions of the bridge are not limiting and can be varied as set by the user. The bridge can be any geometric shape, thickness, width, or length. It can be rectangular, circular, triangular, or any other shape.

As used herein, the term "main part" refers to a portion of thermosetting material representing the finished 3D object. It represents the 3D object that the user is seeking to 3D print. It represents the goal-3D-object once the lead-in block, lead-in bridge, lead-out bridge, and lead-out block layers are removed.

As used herein, the term "lead-out bridge" refers to a portion of thermosetting material that can connect the main part to the lead-out block. The dimensions of the bridge are not limiting and can be varied as set by the user. The bridge can be any geometric shape, thickness, width, or length. It can be rectangular, circular, triangular, or any other shape.

As used herein, the term "lead-out block" refers to a portion of thermosetting material that can connect to the lead-out bridge. The lead-out block can be located in an interior cavity or in an exterior cavity of the main part. Lead-out blocks can be used to slow down flow so material is not spilled onto the part during a subsequent translation of the printer tip. The nth layer of a lead-out block is printed after the nth layer of the main part and the nth layer of the lead-out bridge. The dimensions of the block are not limiting and can be varied as set by the user. The block can be any geometric shape, thickness, width, or length. It can be rectangular, circular, triangular, or any other shape.

Three-Dimensional (3D) Object Production Process and System

In certain embodiments, the present disclosure is directed to a to three-dimensional (3D) object production process comprising: providing a thermoset printing apparatus comprising: a mixing chamber to receive and mix at least a first reactive component and a second reactive component to provide a thermosetting material, an extrusion nozzle to deliver the thermosetting material to form a 3D object, at least one actuator coupled to the extrusion nozzle to move the extrusion nozzle when delivering the thermosetting material to form the 3D object, and a controller comprising one or more processors and coupled to the extruded thermoset printing apparatus, and depositing the thermosetting material to form the 3D object, wherein the depositing comprises depositing a lead-in block layer of thermosetting material, depositing a lead-in bridge layer of thermosetting material, and depositing a main part layer of thermosetting material.

In certain embodiments, the process comprises depositing a lead-out bridge layer of thermosetting material and depositing a lead-out block layer of thermosetting material.

In certain embodiments, the present disclosure is directed to a to three-dimensional (3D) object production process comprising: providing a thermoset printing apparatus comprising: a mixing chamber to receive and mix at least a first reactive component and a second reactive component to provide a thermosetting material, an extrusion nozzle to deliver the thermosetting material to form a 3D object, at least one actuator coupled to the extrusion nozzle to move the extrusion nozzle when delivering the thermosetting material to form the 3D object, and a controller comprising one or more processors and coupled to the extruded thermoset printing apparatus, and depositing the thermosetting material to form the 3D object, wherein the depositing comprises depositing a main part layer of thermosetting material, depositing a lead-out bridge layer of thermosetting material, and depositing a lead-out block layer of thermosetting material.

In certain embodiments, the process comprises depositing a lead-in block layer and depositing a lead-in bridge layer of thermosetting material.

In certain embodiments, the present disclosure is directed to a process for three-dimensional (3D) printing, comprising: depositing a lead-in block layer of thermosetting material, depositing a lead-in bridge layer of thermosetting material, and depositing a main part layer of thermosetting material. In certain embodiments, the process comprises depositing a lead-out bridge layer of thermosetting material and depositing a lead-out block layer of thermosetting material.

In certain embodiments, the present disclosure is directed to a process for three-dimensional (3D) printing, comprising: depositing a main part layer of thermosetting material, depositing a lead-out bridge layer of thermosetting material, and depositing a lead-out block layer of thermosetting material. In certain embodiments, the process comprises depositing a lead-in block layer and depositing a lead-in bridge layer of thermosetting material.

In certain embodiments, the process comprises depositing an exterior of the lead-in block layer. In certain embodiments, the process comprises depositing an exterior of the lead-out block layer. In certain embodiments, the process comprises depositing thermosetting material on an exterior of the lead-in block and/or the lead-out block before depositing thermosetting material inside the exterior. Put another way, thermosetting material can be deposited on a perimeter of the lead-in block and/or lead-out block layer before the area of the layer is filled in.

In certain embodiments, a last bead of the lead-in bridge layer can be adjacent to a first bead of the main part layer. In certain embodiments, a last bead of the main part layer can be adjacent to a first bead of the lead-out bridge layer. In certain embodiments, the connection between the lead-in block layer and/or the lead-out block layer and the main part layer can be a single bead. In certain embodiments, the connection between the lead-in bridge layer and/or the lead-out bridge layer and the main part layer can be more than one bead. In certain embodiments, a portion of the lead-in bridge layer and/or the lead-out bridge layer that can connect to the main part layer is thinner and/or narrower than a different portion of the lead-in bridge layer and/or the lead-out bridge layer. Put another way, the connection between the lead-in bridge layer and/or the lead-out bridge layer can be the thinnest or narrowest portion of the lead-in bridge layer and/or the lead-out bridge layer. In certain embodiments, a portion of the lead-in bridge layer and/or the lead-out bridge layer that can connect to the main part layer is not thinner and/or not narrower than a different portion of the lead-in bridge layer and/or the lead-out bridge layer.

In certain embodiments, the process comprises a gap between the lead-in bridge layer and the main part layer and/or a gap between the main part layer and the lead-out bridge layer. In certain embodiments, the process comprises no gap between the lead-in bridge layer and the main part layer and/or a gap between the main part layer and the lead-out bridge layer.

In certain embodiments of the process, the linear extrusion density of the depositing of the lead-in block layer, the lead-in bridge layer, the main part layer, the lead-out bridge layer, and/or the lead-out block layer can be constant. In certain embodiments, the linear extrusion density of the depositing of the lead-in block layer, the lead-in bridge layer, the main part layer, the lead-out bridge layer, and/or the lead-out block layer can be non-constant. As used herein. "linear extrusion density" refers to the amount of material deposited per distance that is translated by the printer tip. The linear extrusion density can be described in E/mm or g/mm. E/mm can be a result of the G-Code and settings on the printer; g/mm can represent the physical behavior. E/mm describes the E value that the printer sees (a command to move the extruder axis a specified distance), while the g/mm describes the physical behavior of the printer (how much material is extruded). Depending on how the printer is configured using the G-Code, the extruder can pump out different masses or volumes for the same E/mm. Combined with bead width, E/mm can represent the layer height. Grams extruded per millimeter travelled can be a direct quantity of the print behavior verses the specific settings of the printer.

In certain embodiments, the linear extrusion density and bead width are set such that the layer height of the lead-in block is the same as the layer height in the main part. If the layer height of the lead-in or lead-out block is too high, material can be accumulated on the extrusion tip, which may damage or introduce flaws in the part. In certain embodiments, the linear extrusion density can be from about 0.0001 g/mm to about 0.001 g/mm, including from about 0.00069 to about 0.00092 g/mm and from about 0.0005 g/mm to about 0.0008 g/mm.

In certain embodiments, the process can comprise depositing the thermosetting material using any bead spacing. In certain embodiments, the depositing compromises a bead spacing of the thermosetting material from about 0.1 mm to about 2 mm. In certain embodiments, the depositing compromises a bead spacing of the thermosetting material from about 0.2 mm to about 1 mm. In certain embodiments, the depositing compromises a bead spacing of the thermosetting material from about 0.4 mm to about 0.8 mm.

In certain embodiments, the depositing compromises a bead spacing of the thermosetting material less than about 1 mm. In certain embodiments, the depositing compromises a bead spacing of the thermosetting material less than about 0.8 mm. In certain embodiments, the depositing compromises a bead spacing of the thermosetting material less than about 0.7 mm. In certain embodiments, the bead spacing can be about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.2 mm, about 1.4 mm, about 1.6 mm, about 1.8 mm, or about 2 mm, or any ranges between the specified values.

In certain embodiments, the process can comprise depositing the thermosetting material using any translation speed. In certain embodiments, the depositing compromises a translation speed of at least about 100 mm/min. In certain embodiments, the depositing compromises a translation speed of at least about 500 mm/min. In certain embodiments, the depositing compromises a translation speed of at least about 1000 mm/min. In certain embodiments, the depositing compromises a translation speed of at least about 5000 mm/min. In certain embodiments, the depositing compromises a translation speed of from about 100 mm/min to about 5000 mm/min. In certain embodiments, the depositing compromises a translation speed of from about 800 mm/min to about 2500 mm/min. In certain embodiments, the depositing compromises a translation speed of from about 500 mm/min to about 1000 mm/min.

In certain embodiments, the translation speed can be about 25 mm/min, about 50 mm/min, about 100 mm/min, about 25 mm/min, about 50 mm/mm, about 100 mm/min, about 25 mm/min, about 50 mm/min, about 100 mm/min, about 200 mm/min, about 300 mm/min, about 400 mm/min, about 500 mm/min, about 600 mm/min, about 700 mm/min, about 800 mm/min, about 900 mm/min, about 1000 mm/min, about 1500 mm/min, about 2000 mm/min, about 2500 mm/min, about 3000 mm/min, about 3500 mm/min, about 4000 mm/min, about 4500 mm/min, about 5000 mm/min, about 5500 mm/min, about 6000 mm/min, about 6500 mm/min, about 7000 mm/min, about 7500 mm/min, about 8000 mm/min, about 8500 mm/min, about 9000 mm/min, about 9500 mm/min, about 10000 mm/min, or any ranges between the specified values.

In certain embodiments, a flow rate of the thermosetting material through the extrusion nozzle can be adjusted to optimize the flow rate through the extrusion nozzle. Depending on the properties of the reactive components and the geometry of the desired final 3D product, the flow rate adjustment can vary. As used herein, the term "flow rate through the extrusion nozzle" means a volumetric flow rate, or a volume of material in $mm^3$ that is pushed through the nozzle in a second. The rate can vary depending on the tip diameter. In certain embodiments, the maximum rate can be set by the strength of the pump on the printer. In certain embodiments, the flow rate can controlled by the setting the pump displacement.

In certain embodiments, the flow rate through the extrusion nozzle can be from about 0.1 $mm^3$/s to about 200 $mm^3$/s. In certain embodiments, the flow rate can be from about 1 $mm^3$/s to about 100 $mm^3$/s. In certain embodiments, the flow rate can be from about 5 $mm^3$/s to about 50 $mm^3$/s. In certain embodiments, the flow rate can be about about 0.1 $mm^3$/s, about 0.5 $mm^3$/s, about 1 $mm^3$/s, about 5 $mm^3$/s, about 10 $mm^3$/s, about 15 $mm^3$/s, about 20 $mm^3$/s, about 25 $mm^3$/s, about 30 $mm^3$/s, about 35 $mm^3$/s, about 40 $mm^3$/s, about 45 mm/s, about 50 $mm^3$/s, about 100 $mm^3$/s, about 150 $mm^3$/s, about 200 $mm^3$/s, about 500 $mm^3$/s, about 1000 $mm^3$/s, or any ranges between the specified values. In certain embodiments, the flow rate of the material, combined with the volume of the mixing chamber, can set the extent of reaction of the material at the time that it leaves the nozzle. For example, if the printer is printing at 0.1 $mm^3$/s and the mixer has a volume of 2 $mm^3$, then the reaction mixture can be, on average, about 20 seconds into its reaction. If the flow rate is decreased to 0.01 $mm^3$/s, then the reaction mixture can be, on average, about 200 seconds into its reaction.

In certain embodiments, the thermosetting material can be have a particular viscoelasticity. Viscoelastic materials can have both solid-like and liquid-like properties. In certain embodiments, viscoelasticity can be the ratio of storage modulus to loss modulus. If the thermosetting material is highly elastic, then once a flow stop command is executed, the material can spring back into the printhead. If the material is highly viscous, then the material can flow until the pressure that was used to force extrusion is relaxed within the material. This viscous response can be considered the thermosetting material's latency. The speed of the response of the material to a force change from positive pressure to light suction can depend on the viscosity of the thermosetting material. In certain embodiments, a thermosetting material can flow unless a light suction is supplied. In certain embodiments, the viscoelasticity can have a G'/G" (often referred to as tan delta) greater than about 0.1, about 0.2, about 0.3, about 0.4, about 0.5, about 0.6, about 0.7, about 0.8, about 0.9 or about 1, or any ranges between the specified values.

In certain embodiments, the process comprises removing the lead-in block layer, lead-in bridge layer, lead-out bridge layer, and/or lead-out bridge layer. In certain embodiments, the removing can be by cutting and/or sanding.

In certain embodiments, at least one printing parameter can be the same between each of the depositing of the lead-in block layer, the lead-in bridge layer, the main part layer, the lead-out bridge layer, and/or the lead-out block layer. In certain embodiments, at least one printing parameter can be different between each of the depositing of the lead-in block layer, the lead-in bridge layer, the main part layer, the lead-out bridge layer, and/or the lead-out block layer. In certain embodiments, at least one printing parameter can be the same between the layer and an at least second layer. In certain embodiments, at least one printing parameter can be different between the layer and an at least second layer. As a non-limiting example, the translation speed can be different between the lead-in bridge layer and the main part layer. As a non-limiting example, the flow rate can be different between the main part layer and the lead-out bridge layer.

In certain embodiments, the thermoset printing apparatus can comprise use of a pump. In certain embodiments, the thermoset printing apparatus can comprise a suction pump. In certain embodiments, the process comprises applying suction during the depositing.

In certain embodiments, the suction can be applied for any amount of time. In certain embodiments, the process comprises applying suction for at least about 1 second. In certain embodiments, the process comprises applying suction for at least about 10 seconds. In certain embodiments, the process comprises applying suction for at least about 30 seconds. In certain embodiments, the process comprises applying suction for at least about 1 minute. In certain embodiments, the process comprises applying suction for from about 1 second to about 5 minutes. In certain embodiments, the process comprises applying suction for from about 5 seconds to about 1 minute. In certain embodiments, the process comprises applying suction for from about 10 second to about 30 seconds.

In certain embodiments, the process comprises applying suction for about 1 second, about 2 seconds, about 3 seconds, about 4 seconds, about 5 seconds, about 6 seconds, about 7 seconds, about 8 seconds, about 9 seconds, about 10 seconds, about 11 seconds, about 12 seconds, about 13 seconds, about 14 seconds, about 15 seconds, about 16 seconds, about 17 seconds, about 18 seconds, about 19 seconds, about 20 seconds, about 21 seconds, about 22 seconds, about 23 seconds, about 24 seconds, about 25 seconds, about 26 seconds, about 27 seconds, about 28 seconds, about 29 seconds, about 30 second, about 35 seconds, about 40 seconds, about 45 seconds, about 50 seconds, about 60 second, about 90 seconds, about 2 minutes, about 3 minutes, about 4 minutes, about 5 minutes, or any ranges between the specified values.

In certain embodiments, the process comprises use of a support. As used herein, the term "support" means an object or material that can provide stability during 3D printing.

In certain embodiments, the process comprises depositing a support material during the depositing of the thermosetting material. In certain embodiments, the support material can be an olefinic material. In certain embodiments, the olefinic material can be a polyalkylene, such as polyethylene and/or polypropylene. In certain embodiments, the support can be polylactic acid. In certain embodiments, the support can be acrylonitrile butadiene styrene (ABS). In certain embodiments, the support can be an ABS-like UV-curing rapid resin, such as Elegoo Standard resin. In certain embodiments, the support can be a silicone mat.

In certain embodiments, the support can be coated. In certain embodiments, the support can be coated with a release agent, such as a mold release agent. In certain embodiments, the support can be coated with a paste wax, such as a finish paste wax. In certain embodiments, the support is untreated.

In certain embodiments, the support can be 3D printed with a fused filament fabrication (FFF) printer. In certain embodiments, the support can be 3D printed with a stereolithography (SLA) printer. In certain embodiments, the support can be co-3D printed with the depositing of the 3D object having overhang. In certain embodiments, the support can be 3D printed prior to depositing the 3D object having overhang.

In certain embodiments, the process comprises removing the support. In certain embodiments, the removing can be by melting.

In certain embodiments, the present disclosure is directed to a 3D object produced by the disclosed processes. In certain embodiments, the present disclosure is directed to a 3D object produced using the disclosed systems.

In certain embodiments, the present disclosure is directed to a 3D object comprising: a lead-in block, a lead-in bridge, and a main part. In certain embodiments, the 3D object comprises a lead-out bridge and a lead-out block.

In certain embodiments, the present disclosure is directed to a 3D object comprising: a main part, a lead-out bridge, and a lead-out block. In certain embodiments, the 3D object comprises a lead-in block and a lead-in bridge.

Thermosetting Material

The thermosetting material according to embodiments of the disclosure can be composed of any number of materials.

In certain embodiments, the thermosetting material can be an isocyanate, an isocyanate prepolymer, a urethane, a urea-containing polymer, a polyol prepolymer, an amine prepolymer, a polyol containing at least one terminal hydroxyl group, a polyamine containing at least one amine that contains an isocyanate reactive hydrogen, or mixtures thereof.

In certain embodiments, the thermosetting material can be an isocyanate. In certain embodiments, the thermosetting material can be an isocyanate prepolymer. In certain embodiments, the thermosetting material can be a urethane. In certain embodiments, the thermosetting material can be a urea-containing polymer. In certain embodiments, the thermosetting material can be a polyol prepolymer. In certain embodiments, the thermosetting material can be an amine prepolymer. In certain embodiments, the thermosetting material can be a polyol containing at least one terminal hydroxyl group. In certain embodiments, the thermosetting material can be a polyamine containing at least one amine that contains an isocyanate reactive hydrogen.

In certain embodiments, the thermosetting material can be a urethane and/or urea-containing polymer. In certain embodiments, a urethane and/or urea-containing polymer can be a polymer which contains urethane groups (—NH—(C═O)—O—) as part of the polymer chain. The urethane linkage can be formed by reacting isocyanate groups (—N═C═O) with hydroxyl groups (—OH). A polyurethane can be produced by the reaction of an isocyanate containing at least two isocyanate groups per molecule with a compound having terminal hydroxyl groups. In certain embodiments, an isocyanate having, on average, two isocyanate groups per molecule can be reacted with a compound having, on average, at least two terminal hydroxyl groups per molecule.

In certain embodiments, a urethane and/or urea-containing polymer can be a polymer which contains urea groups (—NH—(C═O)—NH—) as part of the polymer chain. A urea linkage can be formed by reacting isocyanate groups (—N═C═O) with amine groups (e.g., —N(R')$_2$), where each R' is independently hydrogen or an aliphatic and/or cyclic group (typically a (C$_1$-C$_4$)alkyl group)). A polyurea can be produced by the reaction of an isocyanate containing at least two isocyanate groups per molecule with a compound having terminal amine groups.

In certain embodiments, an aliphatic group can be a saturated or unsaturated linear or branched hydrocarbon group. This term can encompass alkyl (e.g., —CH$_3$) (or alkylene if within a chain such as —CH$_2$—), alkenyl (or alkenylene if within a chain), and alkynyl (or alkynylene if within a chain) groups, for example. In certain embodiments an alkyl group can be a saturated linear or branched hydrocarbon group including, for example, methyl, ethyl, isopropyl, t-butyl, heptyl, dodecyl, octadecyl, amyl, 2-ethylhexyl, and the like. In certain embodiments, an alkenyl group can be an unsaturated, linear or branched hydrocarbon group with one or more carbon-carbon double bonds, such as a vinyl group. In certain embodiments, an alkynyl group can be an unsaturated, linear or branched hydrocarbon group with one or more carbon-carbon triple bonds. Unless otherwise indicated, an aliphatic group typically contains from 1 to 30 carbon atoms. In certain embodiments, the aliphatic group can contain 1 to 20 carbon atoms, 1 to 10 carbon atoms, 1 to 6 carbon atoms, 1 to 4 carbon atoms, or 1 to 3 carbon atoms.

In certain embodiments, a cyclic group can be a closed ring hydrocarbon group that is classified as an alicyclic group, aromatic group, or heterocyclic group, and can optionally include an aliphatic group. In certain embodiments, an alicyclic group can be a cyclic hydrocarbon group having properties resembling those of aliphatic groups. In certain embodiments, an aromatic group or aryl group can be a mono- or polynuclear aromatic hydrocarbon group. In certain embodiments, a heterocyclic group can be a closed ring hydrocarbon in which one or more of the atoms in the ring is an element other than carbon (e.g., nitrogen, oxygen, sulfur, etc.). Unless otherwise specified, a cyclic group can have 6 to 20 carbon atoms, 6 to 18 carbon atoms, 6 to 16 carbon atoms, 6 to 12 carbon atoms, or 6 to 10 carbon atoms.

In certain embodiments, a urethane and/or urea-containing polymer can be a polymer that contains both urethane and urea groups as part of the polymer chain. A polyurethane/polyurea can be produced by the reaction of an isocyanate containing at least two isocyanate groups per molecule with a compound having terminal hydroxyl groups and a compound having terminal amine groups. In certain embodiments, a polyurethane/polyurea can be produced by the reaction of an isocyanate containing at least two isocyanate groups per molecule with a compound having terminal hydroxyl groups and terminal amine groups (e.g., a hydroxyl-amine such as 3-hydroxy-n-butylamine (CAS 114963-62-1)). A reaction to make a polyurethane, a polyurea, or a polyurethane/polyurea can include other additives, including but not limited to, a catalyst, a chain extender, a curing agent, a surfactant, a pigment, or a combination thereof.

An isocyanate, which can be considered a polyisocyanate, can have the structure R—(N═C═O)$_n$, where n can be at least 2, at least 3, at least 4, at least 5, at least 6, at least 7, or at least 8, and where R can be an aliphatic and/or cyclic group. In certain embodiments, an isocyanate can have an n that is equivalent to n in methylene diphenyl diisocyanate (MDI). In certain embodiments, the isocyanate can be a di-isocyanate (e.g., R—(N═C═O)$_2$ or (O═C═N)—R—(N═C═O)).

Examples of isocyanates can include, but are not limited to, methylene diphenyl diisocyanate (MDI) and toluene diisocyanate (TDI). Examples of MDI can include, but are not limited to, monomeric MDI, polymeric MDI, and isomers thereof. Examples of isomers of MDI having the chemical formula $C_{15}H_{10}N_2O_2$ can include, but are not limited to, 2,2'-MDI, 2,4'-MDI, and 4,4'-MDI. Examples of isomers of TDI having the chemical formula $C_9H_6N_2O_2$ can include, but are not limited to, 2,4-TDI and 2,6-TDI. In certain embodiments, examples of isocyanates can include, but are not limited to, monomeric diisocyanates and blocked polyisocyanates. In certain embodiments, examples of monomeric diisocyanates can include, but are not limited to, hexamethylene diisocyanate (HDI), methylene dicyclohexyl diisocyanate or hydrogenated MDI (HMDI), and isophorone diisocyanate (IPDI). In certain embodiments, an example of an HDI can be hexamethylene-1,6-diisocyanate. In certain embodiments, an example of an HMDI can be dicyclohexylmethane-4,4'-diisocyanate. Blocked polyisocyanates can be based on HDI or IDPI. In certain embodiments, examples of blocked polyisocyanates can include, but are not limited to, HDI trimer, HDI biuret, HDI uretidione, and IPDI trimer.

In certain embodiments, examples of isocyanates can include, but are not limited to, aromatic diisocyanates, such as a mixture of 2,4- and 2,6-tolylene diisocyanates (TDI), diphenylmethane-4,4'-diisocyanate (MDI), naphthalene-1,5-diisocyanate (NDI), 3,3'-dimethyl-4,4'-biphenylene diisocyanate (TODI), crude TDI, polymethylenepolyphenyl isocyanurate, crude MDI, xylylene diisocyanate (XDI), and phenylene diisocyanate; aliphatic diisocyanates, such as 4,4-methylene-biscyclohexyl diisocyanate (hydrogenated MDI), hexamethylene diisocyanate (HMDI), isophorone diisocyanate (IPDI), and cyclohexane diisocyanate (hydrogenated XDI); and modified products thereof, such as isocyanurates, carbodiimides and allophanamides.

In certain embodiments, a compound having terminal hydroxyl groups (R—(OH)$_n$), where n is at least 2 (referred to herein as "di-functional"), at least 3 (referred to herein as "tri-functional"), at least 4, at least 5, at least 6, at least 7, at least 8, at least 9, and 10, where R is an aliphatic and/or cyclic group, can be a "polyol." In certain embodiments a polyol mixture can include a small amount of mono-functional compounds having a single terminal hydroxyl group.

In certain embodiments, examples of polyols can include, but are not limited to, polyester polyols and polyether polyols. In certain embodiments, examples of polyester polyols can include, but are not limited to, those built from condensation of acids and alcohols. In certain embodiments, examples can include those built from phthalic anhydride and diethylene glyol, phthalic anhydride and dipropylene glycol, adipic acid and butanediol, and succinic acid and butane or hexanediol. In certain embodiments, polyester polyols can be semi-crystalline. In certain embodiments, examples of polyether polyols can include, but are not limited to, those built from polymerization of an oxide such as ethylene oxide, propylene oxide, or butylene oxide from an initiator such as glycerol, dipropylene glycol, TPG (tripropylene glycol), castor oil, sucrose, or sorbitol.

In certain embodiments, examples of polyols can include, but are not limited to, polycarbonate polyols and lactone polyols such as polycaprolactone. In certain embodiments, a compound having terminal hydroxyl groups (R—(OH)$_n$) can have a molecular weight (calculated before incorporation of the compound having terminal hydroxyl groups into a polymer) of from about 200 Daltons to about 20,000 Daltons, such as from about 200 Daltons to about 10,000 Daltons.

In certain embodiments, a compound having terminal amine groups (e.g., R—(N(R')$_2$)$_n$), where n can be at least 2, at least 3, at least 4, at least 5, at least 6, at least 7, at least 8, at least 9, and 10, where R can be an aliphatic and/or cyclic group, and where each R' can be independently hydrogen or an aliphatic and/or cyclic group (e.g., a (C$_1$-C$_4$)alkyl group), can be referred to as a "polyamine." In certain embodiments, a polyamine mixture can include a small amount of mono-functional compounds having a single terminal amine group.

In certain embodiments, a suitable polyamine can be a diamine or triamine, and can be either a primary or secondary amine. In certain embodiments, a compound having terminal amine groups can have a molecular weight (calculated before incorporation of the compound having terminal hydroxyl groups into a polymer) of from about 30 Daltons to about 5000 Daltons, such as from about 40 Daltons to about 400 Daltons.

In certain embodiments, examples of polyamines can include, but are not limited to, diethyltoluene diamine, di-(methylthio)toluene diamine, 4,4'-methylenebis(2-chloroaniline), and chain extenders available under the trade names LONZACURE L15, LONZACURE M-CDEA, LONZACURE M-DEA, LONZACURE M-DIPA, LONZACURE M-MIPA, and LONZACURE DETDA.

In certain embodiments, examples of suitable polyamines can include, but are not limited to, ethylene diamine, 1,2-diaminopropane, 1,4-diaminobutane, 1,3-diaminopentane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1,3- and/or 1,4-cyclohexane diamine, I-amino-3,3,5-trimethyl-5-aminomethyl-cyclohexane, 2,4- and/or 2,6-hexahydrotoluylene diamine, 2,4' and/or 4,4'-diaminodicyclohexyl methane, and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,4' and/or 4,4'-diamino-diphenyl methane; and polyoxyalkylene polyamines.

In certain embodiments, the term polyol and/or polyamine mixture can be a mixture of one or more polyols of varied molecular weights and functionalities, one or more polyamines of varied molecular weights and functionalities, or a combination of one or more polyols and one or more polyamines.

In certain embodiments, the thermosetting material can comprise at least one reactive component. In certain embodiments, the thermosetting material can comprise at least two reactive components. In certain embodiments, the thermosetting material can comprise at least three reactive components. In certain embodiments, the thermosetting material can comprise at least four reactive components.

In certain embodiments, the thermosetting material can be prepared by methods disclosed in WO 2018/106822 and PCT/US2018/064323, each of which is incorporated in its entirety herein. In certain embodiments, a method for making a thermosetting material, such as a urethane and/or urea-containing polymer thermoset product, can include introducing first and second reactive components into a mixing chamber. In certain embodiments, the first reactive component can include an isocyanate and the second reactive component can include a polyol and/or polyamine mixture. In certain embodiments, the first reactive component can include an isocyanate and the second reactive component can include a polyol. In certain embodiments, the first reactive component can include an isocyanate and the second reactive component can include a polyamine. In certain embodiments, the first reactive component can include an isocyanate and the second reactive component can include a polyol and a polyamine. The first and second reactive components can have certain characteristics including, but not limited to, viscosity, reactivity, and chemical compatibility.

In certain embodiments, the thermosetting material can be a solid thermosetting material.

In certain embodiments, the thermosetting material can be a foam thermosetting material.

In certain embodiments, the thermosetting material can be a solid thermosetting material and a foam thermosetting material.

While the following description is in the context of foams, the description can apply to thermosetting materials, including urethane and/or urea-containing polymers in general, both non-foam and foam. Foams are available in a range of hardness and resiliencies. A urethane and/or urea-containing polymer can be very durable, permitting the foam to be used repeatedly without a change in properties. This range of properties permits these materials to be used in clinical settings where rigid positioning is desirable or where pressure distribution is more desirable.

Foams of urethane and/or urea-containing polymers can be the product of a reaction between two reactant components. A range of foam properties can be achieved by altering the relative weights of formulation components to balance reaction speed, interfacial tension of the reacting mixture, and elasticity of the polymeric scaffold. In 3D printing, an extrusion nozzle can deposit material, e.g., thermosetting material, on a substrate layer by layer, following a 3D computer model of the desired 3D object.

In certain embodiments, foam precursor formulas can enable high resolution 3D deposition to form a custom 3D foam object. In certain embodiments, by partially advancing the reaction of the precursors, such as polyurethane precursors, and adjusting catalyst and surfactant levels, it is possible to deposit the thermosetting material while maintaining the desired predetermined part resolution and mechanical integrity of the foam.

The production of a foam of urethane and/or urea-containing polymers can differ from the production of a non-foam urethane and/or urea-containing polymer by the inclusion of water. Foams of urethane and/or urea-containing polymer can be formed by the simultaneous reaction of isocyanates with water to form urea linkages and produce gas, and the reaction of isocyanates with multifunctional high molecular weight alcohols to form a crosslinked elastomeric foam scaffold.

In certain embodiments, foams can be formed by reacting monomers: a di-isocyanate, water, and multi-functional alcohol (e.g., a polyol) or a multi-functional amine. The quantity of water in the formula can affect the foam density and the strength of the foam scaffold. The molecular weight of the polyol and/or polyamine mixture can determine the crosslink density of the foam scaffold and the resulting elasticity, resiliency, and hardness of the foam. In certain embodiments, a nearly stoichiometric quantity of di-isocyanate can be used to fully react with the water and a polyol and/or polyamine mixture.

In certain embodiments, prepolymer synthesis can be used to alter the cure profile of a polyurethane or poly urea system. In prepolymer synthesis, a stoichiometric excess of di-isocyanate can be reacted with a polyol and/or polyamine mixture. The resulting prepolymer can have a higher molecular weight than the starting di-isocyanate, and molecules in the pre-polymer can have isocyanate functionality and therefore still be reactive. Because of the higher molecular weight, hydrogen bonding, and/or urea linkages, the prepolymer can also have a higher viscosity. This prepolymer can be subsequently reacted with a polyol and/or polyamine mixture and water to produce a foam with substantially the same foam scaffold composition that is achievable without prepolymer synthesis. However, viscosity growth profile can be altered, typically starting higher, and increasing more slowly, and therefore the morphological features of the foam, such as foam cell size and cell stability, can result in a foam with a very different appearance.

Support foams are not a single density, hardness, or resilience, but can span a wide range of performance. The present disclosure extends the entire range of foam properties. Foam density and hardness can be interrelated: low density foams can be softer foams. A range of foam density and hardness can be achieved first by varying the level of blowing agent, such as water, in the formulation and by adjusting the extent of excess isocyanate in the formula. Increasing the degree of functionality of the components of the polyol and/or polyamine mixture (e.g., incorporating some 4- or 6-functional polyols) can increase hardness and the viscosity growth rate during cure. Foam resilience can be altered by varying the polyols and/or polyamines incorporated in the formula. Memory foams can be achieved by reducing the molecular weight of the polyols and polyamines; high resiliency can be achieved by incorporating graft polyols. In certain embodiments, the foam density range can be less than 0.3 g/cm, ranging from 30-50 ILFD hardness, and resilience ranging from 10 to 50%. Foam properties can also include open cell content and closed cell content. Open cell foams can be cellular structures built from struts, with windows in the cell walls which can permit flow of air or liquid between cells. Closed cells can be advantageous for preventing air flow, such as in insulation applications.

Controller, Sensors, and Processors

In certain embodiments, the present disclosure includes a control system or a computing apparatus operably coupled to a printing apparatus.

The computing apparatus can be, for example, any fixed or mobile computer system (e.g., a controller, a microcontroller, a personal computer, minicomputer, etc.). The exact configuration of the computing apparatus is not limiting, and essentially any device capable of providing suitable computing capabilities and control capabilities can be used, a digital file can be any medium (e.g., volatile or non-volatile memory, a CD-ROM, magnetic recordable tape, etc.) containing digital bits (e.g., encoded in binary, etc.) that can be readable and/or writeable by computing apparatus. Also, a file in user-readable format can be any representation of data (e.g., ASCII text, binary numbers, hexadecimal numbers, decimal numbers, graphically, etc.) presentable on any medium (e.g., paper, a display, etc.) readable and/or understandable by an operator.

In certain embodiments, the control system can include one or more processors.

In certain embodiments, the system can the control system comprises one or more sensors. In certain embodiments, the one or more sensors can detect the location of the 3D printed object during the depositing.

In certain embodiments, the one or more sensors can detect the location of the 3D printed object during the depositing and optimize the depositing of the thermosetting material based on the shape and location of the 3D printed object.

In certain embodiments, the controller can comprise one or more processors and can provide instructions to the extruded thermoset printing apparatus. These instructions can modify the process for printing a 3D printed object. In certain embodiments, these instructions instruct at least one actuator operably coupled to the extrusion nozzle to move the extrusion nozzle when delivering thermosetting material to form the 3D printed object.

In certain embodiments, a controller can analyze aspect ratio and deposit thermosetting material based on the aspect ratio of a bead. For example, the controller can instruct the 3D printer to print with a low aspect ratio/high viscosity bead for certain aspects of a 3D printed object and then the controller can instruct the 3D printer to print with a high aspect ratio/low viscosity bead for other aspects of a 3D printed object. This controlling of aspect ratio can provide a 3D printed object with high resolution, e.g., on the edges of a 3D object, and then use increased printing speeds to space fill aspects of a 3D object.

In certain embodiments, the controller can adjust one or both of the amount and flow rate of the thermosetting material to provide a physical property of a first area that is different than the same physical property of the second area. In certain embodiments, the physical property can be one or more of flexibility, color, optical refractive index, hardness, porosity, and density.

In certain embodiments, the controller can be configured to execute or the process further comprises adjusting one or both of an amount and a flow rate of a gas-generation source for use with one or more of a first, second, and third reactive components.

In certain embodiments, the controller can be configured to execute or the process further comprises controlling a distance between the extrusion nozzle and the 3D printed object.

EXAMPLES

The processes, systems, and objects described herein are now further detailed with reference to the following examples. These examples are provided for the purpose of illustration only and the embodiments described herein should in no way be construed as being limited to these examples. Rather, the embodiments should be construed to encompass any and all variations which become evident as a result of the teaching provided herein.

Example 1: Printing of 3D Object

A cylindrical ring was printed with at 0.00069 g/mm, a bead spacing of 0.6 mm, an initial layer height of 1.0 mm, and subsequent layer height of 0.98 mm. Using these parameters, the body of a lead-in block that was 145.7 mm long and 10 mm wide was printed. The body of the lead-in block was constructed by printing 6 adjacent lines of material, which were each 145.7 mm long. A 5.2 mm by 1.2 mm bridge of the lead-in part was printed by printing 3 lines which were 5.2 mm long. The last bead of the lead-in block was directly adjacent to the first bead of the outer perimeter of the ring. The first layer of the ring was printed. Then the printer head increased its tip height, and moved to the beginning of the print path for the lead-in block, to print the next layer of both the lead-in block and the ring. This process continued for another two layers.

The part was removed from the printer and placed in an oven overnight. The next morning the lead-in block was removed using flush cutters.

Example 2: Printing of 3D Object with Lead-in Block

Figure 2:
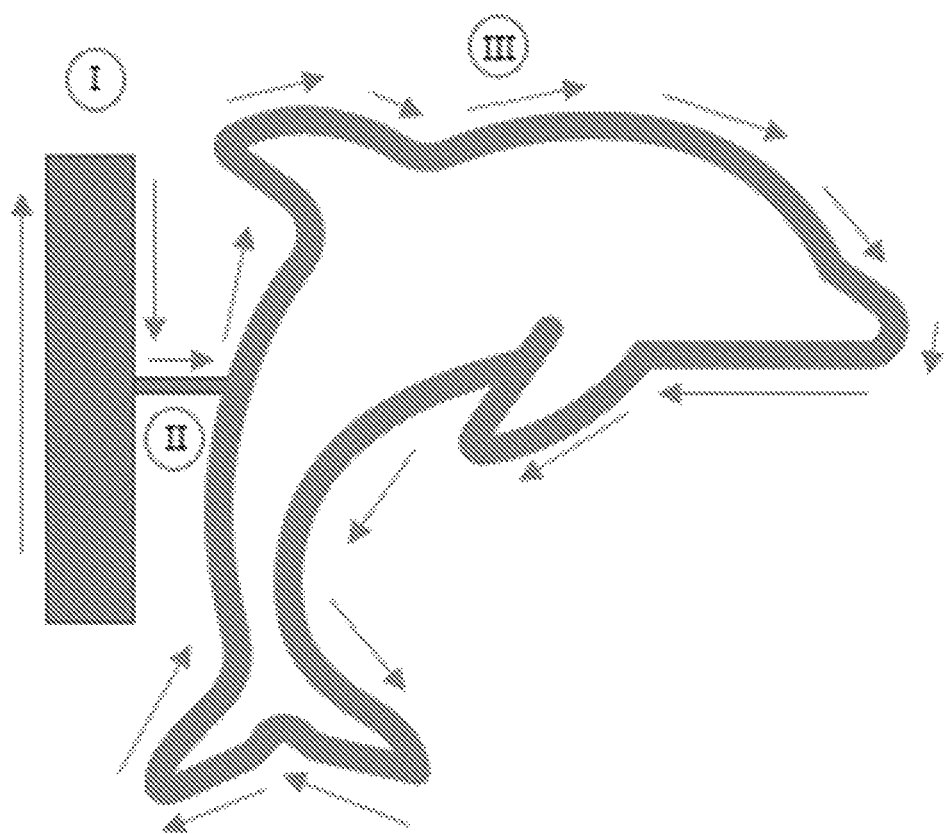
FIG. 2 depicts a diagram for 3D printing having a lead-in block and lead-in bridge.

The diagram depicted in FIG. 2 can be printed as follows:
I. The first step is to print the body of the block,
II. The next step is to print the bridge between the body of the block and the main part, and
III. Print the main part. Return to step 1 to print any subsequent layers.

For the lead-in blocks, a 10 mm by 2 mm body of the lead-in block is printed (I). The block is oriented so that it does not intersect the path of the main print.

Then, a 3 mm by 2 mm bridge of the lead-in block is printed, which connects the body of the block to the main part (II). The bridge is oriented so that the last bead of the bridge is directly adjacent to the first bead of the main block.

Then, the main part is printed (Ill). The bead spacing, tip height, and linear extrusion density of the lead-in block can be the same as that of the main part.

What is claimed is:

1. A process for three-dimensional (3D) printing comprising:
depositing a thermosetting material comprising at least a first reactive component and a second reactive component onto a substrate via continuous extrusion to form a lead-in block layer of the thermosetting material, a lead-in bridge layer of the thermosetting material, and a main part layer of the thermosetting material, then
depositing one or more subsequent layers of the thermosetting material onto the lead-in block layer of the thermosetting material, the lead-in bridge layer of the thermosetting material and the main part layer of the thermosetting material to form a lead-in block, a lead-in bridge and a main part, respectively, wherein the lead-in bridge is a portion of the thermosetting material connecting the lead-in block to the main part, and then removing the lead-in block of thermosetting material and the lead-in bridge of thermosetting material from the main part of thermosetting material.

2. The process according to claim 1, wherein the process further comprises:
depositing the thermosetting material onto the substrate via continuous extrusion to form a lead-out bridge layer of thermosetting material and a lead-out block layer of thermosetting material.

3. The process according to claim 2, wherein the depositing between the main part layer and the lead-out bridge layer is continuous.

4. The process according to claim 1, wherein the depositing of the lead-in block layer, the lead-in bridge layer, and the main part layer is carried out at a constant linear extrusion density.

5. The process according to claim 1, wherein the first reactive component includes an isocyanate and the second reactive component includes a polyol.

6. The process according to claim 5, wherein the thermosetting material comprises at least one third reactive component, wherein the third reactive component comprises a polyamine.

7. The process according to claim 1, wherein the thermosetting material is a foam thermosetting material.

8. The process according to claim 7, wherein the first reactive component comprises a diisocyanate, the second reactive component comprises a polyol, and the thermosetting material further comprises water to produce gas by reacting with the diisocyanate.

9. The process according to claim 1, wherein the thermosetting material comprises at least a third reactive component.

10. The process according to claim 9, wherein the thermosetting material comprises at least a fourth reactive component.

11. The process according to claim 1, wherein the thermosetting material has a viscoelasticity having a G'/G" value greater than about 0.1.

12. A process for three-dimensional (3D) object printing comprising:
depositing them thermosetting material comprising at least a first reactive component and a second reactive component onto a substrate via continuous extrusion to form a main part layer of the thermosetting material, a lead-out bridge layer of the thermosetting material and a lead-out block layer of the thermosetting material,
depositing one or more subsequent layers of the thermosetting material onto the main part layer of the thermosetting material, the lead-out bridge layer of the thermosetting material and the lead-out block layer of the thermosetting material to form a main part, a lead-out bridge and a lead-out block, respectively, wherein the lead-out bridge is a portion of the thermosetting material connecting the main part to the lead-out block, and
removing the lead-out bridge of thermosetting material and the lead-out block of thermosetting material from the main part of thermosetting material.

13. The process according to claim 12, wherein the thermosetting material comprises at least a third reactive component.

14. The process according to claim 13, wherein the thermosetting material comprises at least a fourth reactive component.

15. The process according to claim 12, wherein the first reactive component includes an isocyanate and the second reactive component includes a polyol.

16. The process according to claim 15, wherein the thermosetting material comprises at least one third reactive component, wherein the third reactive component comprises a polyamine.

17. The process according to claim 12, wherein the thermosetting material is a foam thermosetting material.

18. The process according to claim 17, wherein the first reactive component comprises a diisocyanate, the second reactive component comprises a polyol, and the thermosetting material further comprises water to produce gas by reacting with the diisocyanate.

19. The process according to claim 12, wherein the thermosetting material has a viscoelasticity having a G'/G" value greater than about 0.1.

* * * * *